Figure 1:
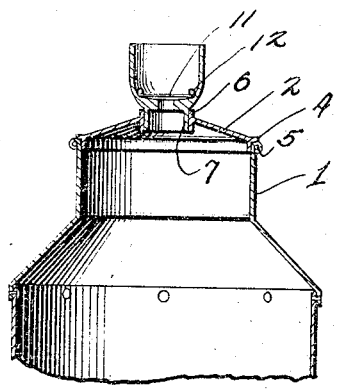

J. P. RICHARD.
MILK STRAINER.
APPLICATION FILED NOV. 26, 1917.

1,287,103.

Patented Dec. 10, 1918.

Inventor
J. P. Richard

UNITED STATES PATENT OFFICE.

JOHN P. RICHARD, OF NEW HOLSTEIN, WISCONSIN.

MILK-STRAINER.

1,287,103.  Specification of Letters Patent.  Patented Dec. 10, 1918.

Application filed November 26, 1917. Serial No. 203,996.

*To all whom it may concern:*

Be it known that I, JOHN P. RICHARD, a citizen of the United States, residing at New Holstein, in the county of Calumet, State of Wisconsin, have invented certain new and useful Improvements in Milk-Strainers; and I do hereby declare the following to be a full, clear, and exact description of the invention, such as will enable others skilled in the art to which it appertains to make and use the same.

This invention relates to milk strainers for dairy use.

The object of the invention is to provide an improved form of milk strainer which is adaptable to milk cans of various types. Milk can constructions have recently undergone certain modifications from the old standards, so that the tops of the cans in the newer form are provided with a larger opening than the older form. My invention provides a strainer which is adaptable to both forms of milk cans so that it may completely cover the mouth of either style of can with such a fit as to exclude dirt, bugs and straw from the cans. Also, the invention contemplates a strainer from which a section may be removed for use in straining milk into small cream cans.

With the above objects in view, and such others relating to the details of construction, as may hereinafter appear, my invention will now be fully set forth and described, reference being had to the accompanying drawings.

In the drawings:—

Figure 2:
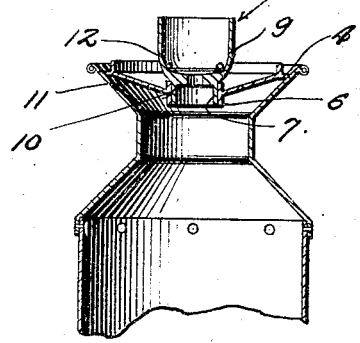
Figure 3:
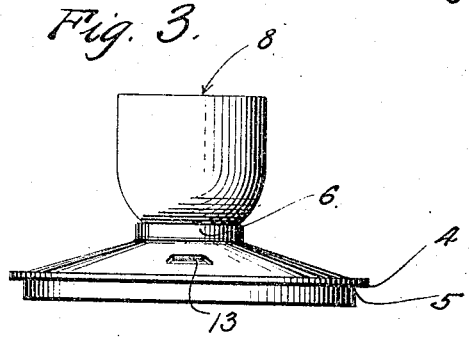
Figure 4:
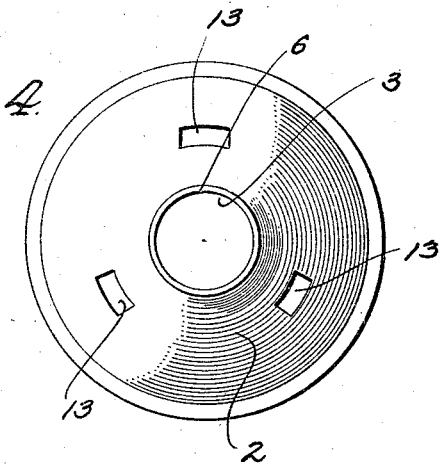
Figure 5:
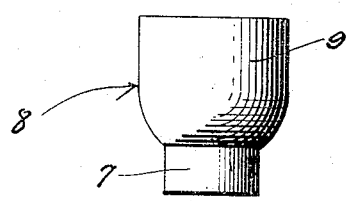

Figure 1 is a vertical section through a milk can of the newer type showing my invention applied thereto, Fig. 2 is a similar section of a portion of a milk can of the older type, showing my invention in use thereon, Fig. 3 is a vertical section through the assembled strainer, Fig. 4 is a plan view of the cover section of the strainer, and Fig. 5 is an elevation of the strainer section alone.

Referring more particularly to the drawings, 1 represents the top of a milk can of the new type upon whose rim the cover section 2 is seated. The cover section 2 is formed from a disk which is slightly dished with a gradual incline toward a central opening 3. Around the margin of the cover section 2 there is formed a rim or flange 4 which is so shaped as to provide a shoulder or seat 5 along the margin of the cover section which the base of the flange 4 overhangs, the seat 5 being adapted to be engaged with the margin of the milk can opening in fitted relation. The flange 4 is furthermore upwardly directed away from the seat 5 so that it rises above the outer or convex surface of the disk. Fitted through the opening 3 in the center of the disk is a sleeve or collar 6, said sleeve or collar 6 extending in both directions away from the opening 3 in flange-like relation to provide a seat or socket within which the spout 7 of the strainer 8 is removably fitted.

The strainer 8 is formed of a bowl 9 which rises from the spout 7, the bottom of the bowl having a central opening 10 which is smaller than the cross sectional area of the spout 7, so that the milk is delivered from the bowl into the center of the spout without first coming into contact with the inner wall of the latter. A strainer fabric 11 of any suitable material is extended across the opening 10, and may, if desired, be held in position by means of a removable clamping ring 12.

The spout 7 is of practically the same length as the sleeve 6, and may be inserted therein from either end, the sleeve providing a solid seat for the strainer section, and by reason of the fact that it projects beyond the disk in both directions, delivers the milk directly into the can without permitting it to run over the surface of the disk as it passes out of the strainer spout. A suitable number of ventilating openings 13 are formed through the disk, so that the milk will flow freely into the cans from the strainer.

In the positions shown in Fig. 1, the seat 5 fits into the margin of the can top, the disk then rising above the can top by reason of its dished or concavital construction. The strainer spout when inserted into the sleeve 6 has its lower end coincided with the lower end of the sleeve, so that the milk flows directly off of the end of said sleeve into the can without coming into contact with the inner surface of the cover section so as to flow toward the edge thereof. When used with a can of the older type, as indicated in Fig. 2, the convexed side of the disk is seated upon the top or rim of the can, with the projecting portion of the flange 4 brought into such contact with the rim as to exclude the dirt and straw from the can. Obviously, in this case, the strainer 8 is inserted into the reverse end of the sleeve 6 and hereto the milk is prevented from coming into contact with the jaw of the disk. When it is desired to fill tin cans by the use of the strainer, the strainer section alone is used, the spout 7 being of such dimension that it will fit within the standard cream can top.

It will be apparent from the foregoing description that I have provided a very practical and efficient strainer which may be used with equal facility upon old and new type cans, not only to efficiently strain the milk, but to exclude dirt, straw and insects from cans of equal type.

What I claim as my invention is:

The combination with a slightly dished cover section adapted to snugly fit the mouth of a receptacle and having a circumferentially flanged center opening, of a bowl-like element having an opening in its bottom of less size than the flanged center opening, a spout of less diameter then the element and depending therefrom concentrically of the bottom opening to removably telescope within the flanged opening of said cover section, and a strainer fabric covering the bottom opening in said element, the spout being of corresponding depth to the flange of the first named opening.

In testimony whereof, I affix my signature in the presence of two witnesses.

JOHN P. RICHARD.

Witnesses:
FRED HOELFEL, Jr.,
ANTON RICHART.

Copies of this patent may be obtained for five cents each, by addressing the "Commissioner of Patents, Washington, D. C."